United States Patent

Blechschmidt et al.

(10) Patent No.: US 6,729,458 B2
(45) Date of Patent: May 4, 2004

(54) SYNCHRONIZING DEVICE WITH ASYMMETRICAL TOOTHING

(75) Inventors: Dirk Blechschmidt, Brandenburg (DE); Wolfgang Bernau, Brandenburg (DE); Kurt Bathe, Brandenburg (DE); Heinz Bassner, Karlsfeld (DE); Thomas Ebert, München (DE)

(73) Assignees: ZF Friedrichshafen AG, Friedrichshafen (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/258,871
(22) PCT Filed: May 5, 2001
(86) PCT No.: PCT/EP01/05115
§ 371 (c)(1),
(2), (4) Date: Oct. 25, 2002
(87) PCT Pub. No.: WO01/86163
PCT Pub. Date: Nov. 15, 2001

(65) Prior Publication Data
US 2003/0106762 A1 Jun. 12, 2003

(30) Foreign Application Priority Data
May 10, 2000 (DE) .................... 100 22 509

(51) Int. Cl.⁷ .................................... F16D 23/06
(52) U.S. Cl. ............... 192/53.34; 74/339; 192/108
(58) Field of Search ................. 192/53.34, 69.9, 192/108; 74/339

(56) References Cited

U.S. PATENT DOCUMENTS

| 4,189,041 A | 2/1980 | Müller ................ 192/53 F |
| 4,817,773 A | 4/1989 | Knödel et al. ........ 192/53 R |
| 4,905,806 A | 3/1990 | Hillenbrand et al. ... 192/53 F |
| 4,989,706 A | * 2/1991 | Morscheck ............... 74/339 |

FOREIGN PATENT DOCUMENTS

| DE | 966 366 | 7/1957 | ......... B62D/8/41 |
| DE | 26 59 448 | 8/1978 | ......... F16D/23/02 |
| DE | 34 44 670 C1 | 7/1986 | ......... F16D/23/06 |
| DE | 37 28 903 C1 | 11/1988 | ......... F16D/23/02 |
| DE | 196 46 850 C1 | 11/1997 | ......... F16D/23/06 |
| EP | 0 425 195 A1 | 5/1991 | ......... F16D/23/06 |
| FR | 1.152.699 | 2/1958 | |
| JP | 07190092 | 7/1995 | ......... F16D/23/06 |
| JP | 09273571 | 10/1997 | ......... F16D/23/06 |
| JP | 11351272 A | 12/1999 | ......... F16D/23/06 |

* cited by examiner

*Primary Examiner*—Rodney H. Bonck
(74) *Attorney, Agent, or Firm*—Davis & Bujold, PLLC

(57) ABSTRACT

In a synchronizing device (22) for shift clutches, specially of selector transmissions (2) for motor vehicles, having at least one pair of wheels of which the gearwheel coaxial with a sliding sleeve (28) has a clutch body (46) with outer tooth (48) which by axial displacement of the sliding sleeve (28), non-rotatably connected with a shaft (8) via a synchronizer body (24) and having an inner tooth (26), can be switched in and off the power flow. A synchronizer ring (50) has in peripheral direction a form-locking connection with the sliding sleeve (28) and a frictional-engagement connection with the clutch body (46) and has blocking surfaces (62, 74) for the sliding sleeve (28) which upon each relative rotation between clutch body (46) and sliding sleeve (28) prevent in the end positions defined by the form-locking connection between synchronizer ring (28) and sliding sleeve (28) an engagement of the inner tooth (26) of the sliding sleeve (28) with the outer tooth (48) of the clutch body (46) and allow the engagement only when synchronous rotational speed is attained during rotation of synchronizer ring (50) and clutch body (46). The downshift blocking surface (56) on the inner tooth (26) of the sliding sleeve (28) has an axial extension (58) smaller than the axial extension (60) of the upshift blocking surface (54).

2 Claims, 2 Drawing Sheets

SYNCHRONIZING DEVICE WITH ASYMMETRICAL TOOTHING

FIELD OF THE INVENTION

The invention relates to a synchronizing device.

BACKGROUND OF THE INVENTION

Synchronizing devices for selector transmissions of motor vehicles have a sliding sleeve non-rotatably connectable with a shaft by axial displacement and having an inner tooth, a clutch body provided with an outer tooth and a synchronizer ring which in peripheral direction has a form-locking connection with the sliding sleeve via an outer tooth and a frictional-engagement connection with the clutch body. The teeth of the synchronizer ring has blocking surfaces which are disposed relative to each other forming an angle for engaging corresponding blocking surfaces of the teeth of the sliding sleeve.

Such synchronizing devices are widely known and have been described, for example, in German Patent 26 59 448. If a gear is activated by moving the sliding sleeve in axial direction out of the neutral position, the sliding sleeve takes along the synchronizer ring pressing it against an opposed cone of the clutch body. Hereby is produced a frictional-engagement connection between synchronizer ring and clutch body whereby a rotational speed adaptation is obtained between the shaft, the sliding sleeve and the synchronizer ring, the same as between the clutch body and the appertaining gearwheel of the wheel pair to be engaged. Blocking surfaces provided on the synchronizer ring are at the same time brought to a position in which they attain engagement with appertaining and adapted blocking surfaces on the sliding sleeve and thereby prevent an axial displacement of the sliding sleeve in direction to the clutch body. The blocking surfaces are usually fitted on an outer tooth of the synchronizer ring adapted to the outer tooth of the clutch body; the mating surfaces are here mounted on the ends of the teeth which form the inner tooth of the sliding sleeve. Not until reaching the synchronous rotational speed can the sliding sleeve be inserted in the outer tooth of the clutch body past the blocking surfaces of the synchronizer ring.

When upshifting the transmission, that is, when introducing a higher gear, the gearwheel coaxial with the sliding sleeve to which the connection is produced upon upshifting rotates at first quicker than the sliding sleeve so that it usually has to be decelerated to reach a synchronous speed via the synchronizer ring. But if strong braking forces appear upon the transmission, for example, as consequence of the higher viscosity of the transmission oil when the transmission is cold, the wheel set is retarded by the braking forces after disengagement of the lower gear whereby the rotational speed of the transmission during engagement of the higher gear can drop to a point where synchronous speed results between the sliding sleeve and the clutch body, and the sliding sleeve slides past the locking surfaces on the synchronizer ring without frictional-engagement connection being produced between the synchronizer ring and the clutch body. Due to this braking effect and further reduction of the rotational speed of the gearwheel coaxial with the sliding sleeve, it is possible to arrive at a so-called cold rasping which is felt as disagreeable.

To prevent said unpleasant noise, German Patent 34 44 670 describes a synchronizing device for gear clutches of selector transmissions for motor vehicles having at least one wheel pair whose gearwheel coaxial with the sliding sleeve non-rotatably connected with a shaft via a synchronizer body and having an inner tooth can be switched in and off the power flow, the same as having a synchronizer ring which in peripheral direction has a form-locking connection with the sliding sleeve and a frictional-engagement connection with the clutch body and which has blocking surfaces for the sliding sleeve which upon each relative rotation between clutch body and sliding sleeve prevent in the end positions defined by the form-locking connection between synchronizer ring and sliding sleeve an engagement of the inner tooth of the sliding sleeve in the outer tooth of the clutch body and allow it only when reaching the synchronous rotational speed during rotation of synchronizer ring and clutch body. The in moving direction forward blocking surfaces on the sliding sleeve have here a larger axial extension than the in moving direction rear blocking surfaces. The outer tooth of the clutch body, the same as the blocking surfaces of the sliding sleeve, are asymmetrically designed but in a manner such that even though having the same inclination relative to the axial direction are offset in relation to the longitudinal center of each tooth so that the two treads belonging to one tooth have different axial extensions and thus surfaces of different size, the in moving direction forward blocking surfaces on the sliding sleeve having the larger axial extension compared with that of the in moving direction rear blocking surface.

By using a defined asymmetry in the ridge of the blocking tooth of the sliding sleeve, there is purposefully reinforced the effect that in an upshift after end of the synchronizing operation, the synchronizer ring enters in the downshift blocking position before the sliding sleeve with its downshift blocking edge has run past the downshift blocking edge of the synchronizer ring. The downshift blocking position is the position on the opposite rotation stop while the downshift blocking surface is the long one of the blocking surfaces on the sliding sleeve. After unblocking from said downshift blocking position, the shifting operation can be terminated without rasping engagement. However, as result of the above described asymmetry, there occurs on the sliding sleeve after an upshift, while the synchronizer ring enters in the downshift blocking position, a power pulse clearly to be felt as impact on the shifting lever.

The problem on which the invention is based is to prevent the power pulse on the sliding sleeve, thus preventing the impact acting upon the shift lever.

SUMMARY OF THE INVENTION

The invention proposes for gear clutches, specially of selector transmissions for motor vehicles, a synchronizing device having at least one pair of wheels of which the gearwheel coaxial with a sliding sleeve has a clutch body with outer tooth and by axial movement of the sliding sleeve, non-rotatably connected with a shaft via a synchronizer body and having an inner tooth, can be switched in and off the power flow. The synchronizing device has in addition a synchronizer ring which in axial direction has a form-locking connection with the sliding sleeve and a frictional-engagement connection with the clutch body and which has blocking surfaces for the sliding sleeve which prevent in the end positions defined by the form-locking connection between synchronizer ring and sliding sleeve an engagement of the inner tooth of the sliding sleeve with the outer tooth of the clutch body and allow the engagement only when the synchronous rotational speed is reached during rotation of synchronizer ring and clutch body. The in moving direction forward blocking surfaces on the tooth of the sliding sleeve have a smaller extension than the in moving direction rear blocking surfaces. In the invention an asymmetry is defined in the ridge of the blocking tooth of the sliding sleeve which is designed contrary to the tooth mounted according to the prior art. The effect thus obtained is to prevent the entering in the downshift blocking position and to eliminate a clear power surge on the shift lever. The downshift blocking surface constitutes the short blocking surface in axial direction on the sliding sleeve. These facts apply both to the assembly of the synchronizing device on the main shaft or transmission output shaft when the forward blocking surface is in moving direction wherein the sliding sleeve, the synchronizer ring and the synchronizer body have a constant rotational speed and the rotational speed of the loose gearwheel is synchronized, and to the assembly of the synchronizing device upon the countershaft in which the rotational speed of the loose gearwheel is constant and the rotational speed of sliding sleeve, synchronizer ring and synchronizer body is synchronized when the rear blocking surface is in moving direction.

BRIEF DESCRIPTION OF THE DRAWINGS

The invention will now be described, by way of example, with reference to the accompanying drawings in which.

DETAILED DESCRIPTION OF THE INVENTION

Figure 1:
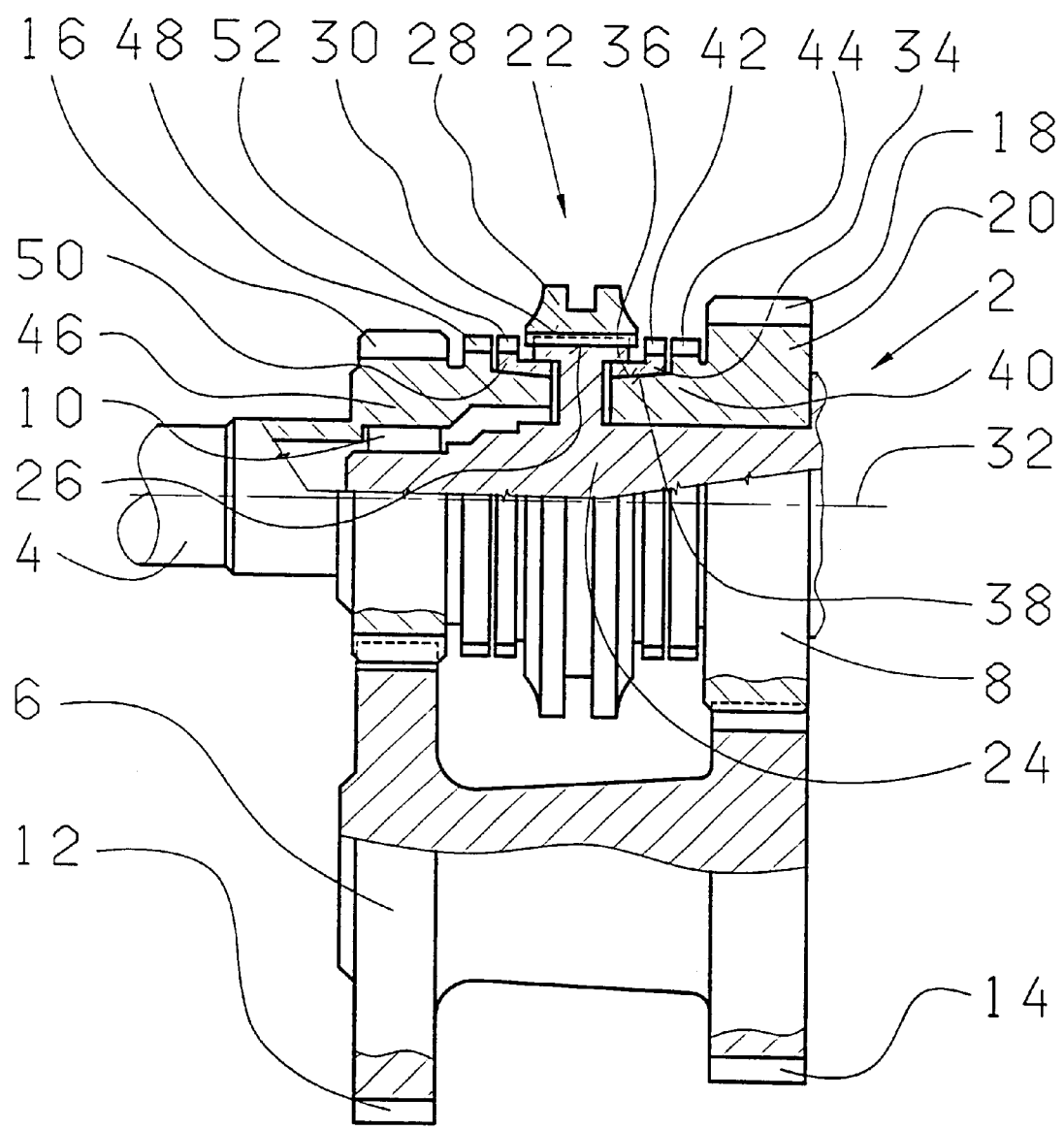
FIG. 1 is a synchronizing device in a transmission.

FIG. 1 shows part of a transmission 2 with an input shaft 4 and a countershaft 6. In the input shaft 4 a main shaft 8 is turnably supported in a bearing 10. The countershaft 6 has two fixed teeth 12 and 14. Upon the input shaft 4 is fixedly mounted a tooth 16. One other tooth 18 is provided upon a loose gearwheel 20 turnably supported on the main shaft 8. The tooth 12 meshes with the tooth 16 while the tooth 14 meshes with the tooth 18. A synchronizing device 22 has a synchronizer body 24 which is fixedly built upon the main shaft 8. It has on its outer periphery an outer tooth 30 on which a sliding sleeve 28 with its inner tooth 26 can be axially moved along the axis of rotation 32 of the main shaft 8. A synchronizer ring 34 with its frusto-conical outer friction face 36 is provided on a correspondingly shaped likewise frusto-conical inner friction face 38 of the clutch body 40. The blocking tooth 42 on the synchronizer ring 34 and the clutch tooth 44 on the clutch body 40 are designed so that the sliding sleeve 28 with its inner tooth 26 can engage in said tooth 42 and 44 when the sliding sleeve 28 is axially displaced. The input shaft 4 likewise has a clutch body 46 with tooth 48 and a synchronizer ring 50 with blocking tooth 52.

Figure 2:
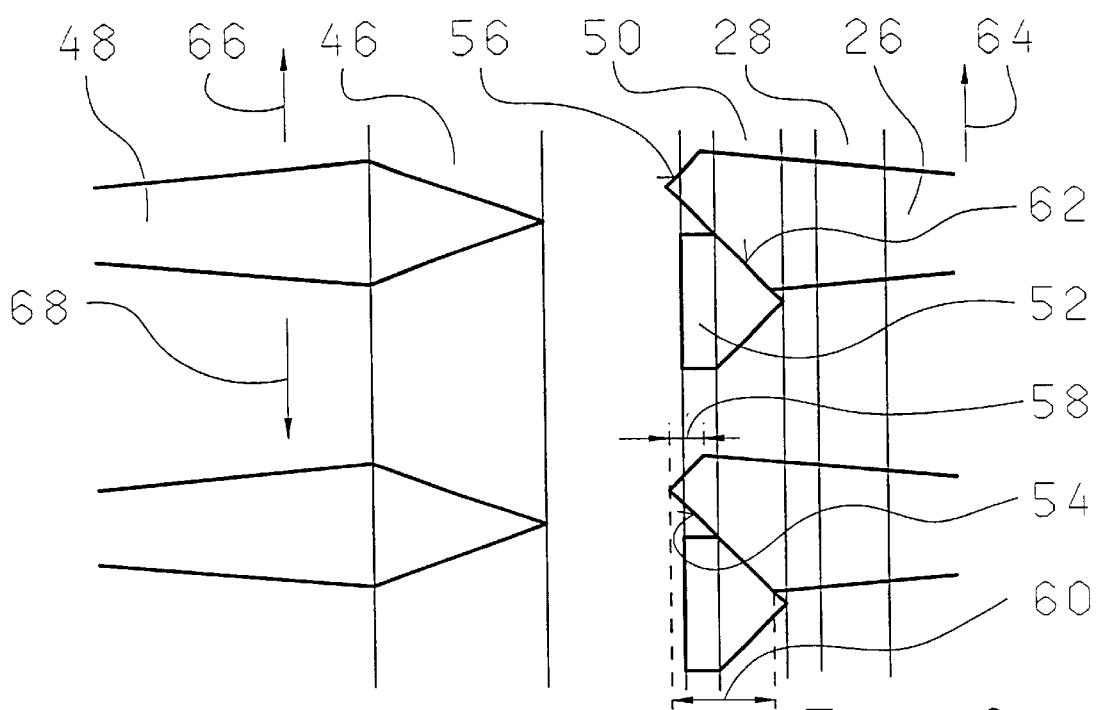
FIG. 2 is the tooth in blocking state.

FIG. 2 shows an inner tooth 26 of the sliding sleeve 28 which has an asymmetrically designed peak. The side 54 of the tooth 26 forms an axial extension 60 larger than the axial extension 58 on the side 56. In the blocking state shown here the side 54 lies on the side 62 of the blocking tooth 52 until synchronous rotational speed is attained between sliding sleeve 28 and clutch 46. The arrow 64 indicates the direction of rotation of the sliding sleeve 28, the arrow 66 the direction of rotation of the clutch body 46 and the arrow 68 the active direction of power loss due to deceleration of the clutch body 46. During the synchronization operation the rotational speed of the clutch body 46 is adapted to the rotational speed of the sliding sleeve 28 while the rotational speed of the synchronizer body 24, the synchronizer ring 50 and the sliding sleeve 28 remains constant.

Figure 3:
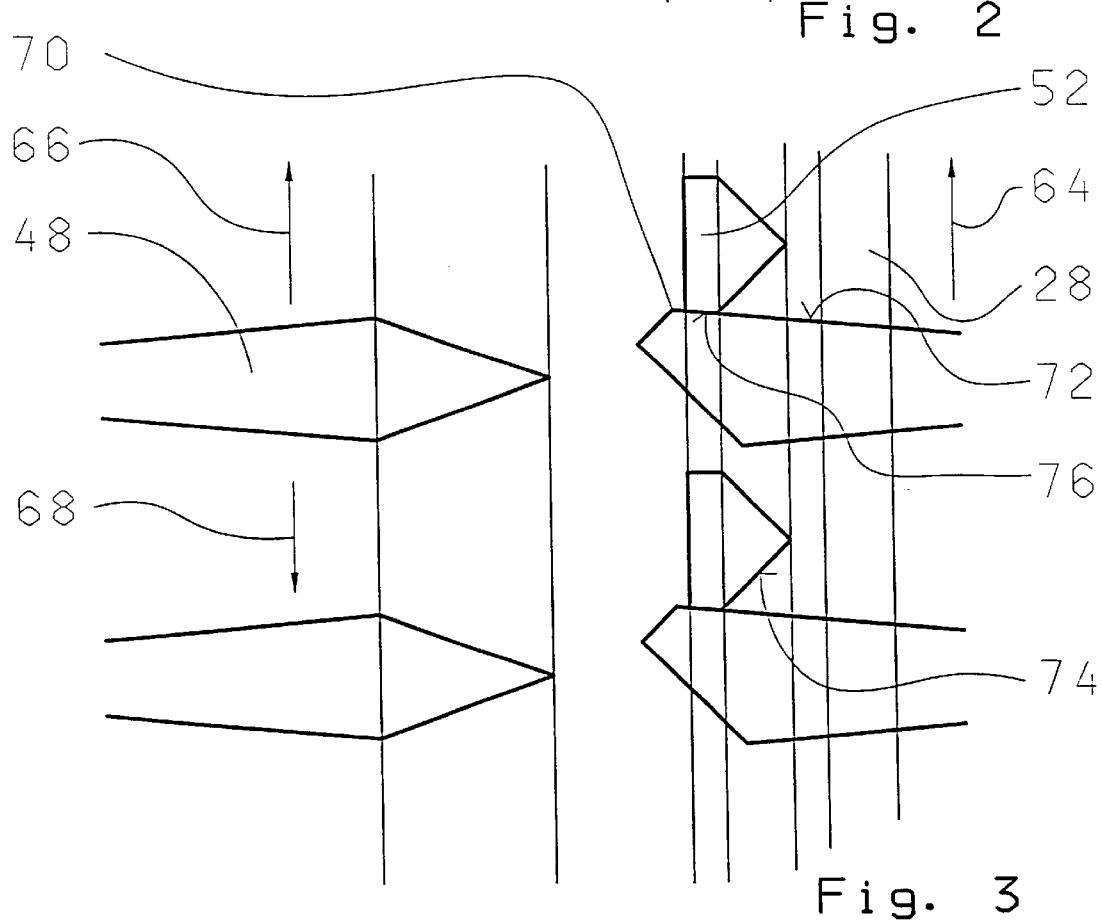
FIG. 3 is the tooth in unblocking state.

In FIG. 3 is shown the unblocked state. In the unblocking phase the synchronizer ring 50 has assumed the same rotational speed as the clutch body 46 due to the force-locking connection via the frusto-conical friction face. The synchronizer ring 50 is thereby turned with the clutch body 46 in direction of the active power loss 68. Due to the shorter axial extension of the side 56, the outer edge 70 of the downshift blocking side 72 is on the sliding sleeve 28 in a position moved away in direction to the peak of the tooth 26. Thereby the outer edge 70 can no longer run up to the blocking side 74 of the blocking tooth 52 during rotation of the synchronizer ring 50 out of the upshift blocking position (FIG. 2) in direction to the downshift blocking position (FIG. 3). The sliding sleeve 28 slides with the downshift blocking side 72 past the lateral edge 76 of the blocking tooth 52. A pulse due to the appearance of the side 56 on the blocking side 74 and a rejection of the sliding sleeve 28 in axial direction is prevented.

Reference Numerals 2 transmission
4 input shaft
6 countershaft
8 main shaft
10 bearing
12 tooth
14 tooth
16 tooth
18 tooth
20 gearwheel
22 synchronizing device
24 synchronizer body
26 inner tooth
28 sliding sleeve
30 outer tooth
32 axis of rotation
34 synchronizer ring
36 friction surface
38 friction surface
40 clutch body
42 blocking tooth
44 clutch tooth
46 clutch body
48 clutch tooth
50 synchronizer ring
52 blocking tooth
54 side
56 side
58 extension
60 extension
62 side
64 arrow
66 arrow
68 arrow
70 outer edge
72 downshift blocking side
74 blocking side
76 side edge

What is claimed is:

1. A synchronizing device (22) for shift clutches of selector transmissions (2) for motor vehicles, the synchronizing device comprising:

a first gearwheel coaxial with a sliding sleeve (28) having inner teeth, said first gearwheel having a clutch body (46) with outer teeth (48) which by axial displacement of said sliding sleeve (28) may be non-rotatably connected with a shaft (8) via a synchronizer body (24);

a synchronizer ring (50) which has a dog tooth-locking connection with said sliding sleeve (28), a frictional-engagement connection with said clutch body (46) and blocking surfaces (62, 74) which interact with downshift blocking surfaces (56) and upshift blocking surfaces (54) on said inner teeth of the sliding sleeve (28);

a blocking position defined by the dog tooth-locking connection between synchronizer ring (50) and sliding sleeve (28) preventing an engagement of said inner teeth (26) of said sliding sleeve (28) with said outer teeth (48) of said clutch body (46) during relative rotation between the clutch body (46) and the sliding sleeve (28), and an engaged position when a synchronous rotational speed is attained between the sliding sleeve (28) and the clutch body (46); and wherein said downshift blocking surfaces (56) on said inner teeth (26) of said sliding sleeve (28) each have smaller axial extensions (58) than an axial extension (60) of each said upshift blocking surface (54).

2. A synchronizing device (22) for a shift clutch of a motor vehicle transmission (2) comprising:

a sliding sleeve (28) having inner teeth (26) radially supported on a synchronizer body;

a clutch body supporting a gearwheel having outer teeth aligned coaxial with the sliding sleeve (28) to engage the inner teeth (26) of the sliding sleeve (28) upon axial displacement of said sliding sleeve (28) to connect the clutch body with a main shaft;

a synchronizer ring (50) positioned between the sliding sleeve (28) and the clutch body (46), the synchronizer ring (50) having a dog tooth-locking connection with said sliding sleeve (28) and a frictional-engagement connection with said clutch body (46);

the synchronizer ring (50) having a first and a second blocking surfaces (62, 74) which interact with a respective downshift blocking surfaces (56) and upshift blocking surfaces (54) formed on the inner teeth of said sliding sleeve (28) to prevent engagement of said inner teeth (26) of said sliding sleeve (28) with said outer teeth (48) of said clutch body (46) upon relative rotation between the clutch body (46) and the sliding sleeve (28), and permit engagement of said inner teeth (26) of said sliding sleeve (28) with said outer teeth (48) of said clutch body (46) when a synchronous rotational speed is reached between the sliding sleeve (28) and clutch body (46); and wherein said downshift blocking surface (56) on said inner teeth (26) of said sliding sleeve (28) has a smaller axial extension (58) than an axial extension (60) of said upshift blocking surface (54).

* * * * *